Oct. 5, 1954  H. DONANDT  2,690,685
TRANSMISSION GEAR MECHANISM
Filed June 3, 1950
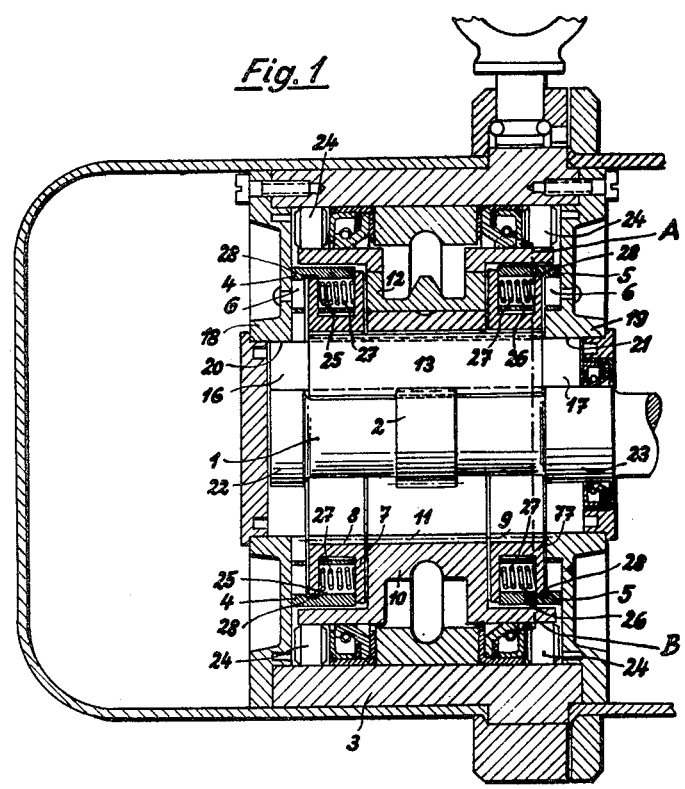
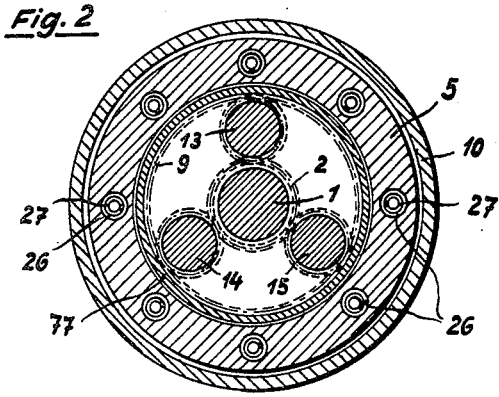
Inventor:
Hermann Donandt Patented Oct. 5, 1954

2,690,685

UNITED STATES PATENT OFFICE 2,690,685

TRANSMISSION GEAR MECHANISM

Hermann Donandt, Karlsruhe, Germany

Application June 3, 1950, Serial No. 165,899

3 Claims. (Cl. 74—801)

This invention relates to transmission gear mechanisms, more particularly to reduction gear mechanisms, as used for winches, conveyer belts, electric hoists, etc.; the arrangement is preferably employed as a speed reduction unit for electrically driven chain winches.

Briefly the invention comprises a planetary gear unit having at least three planet gears which, in their position between a sun gear and internal ring gears, are self-adjusting in a direction tangential to the path of the planet gears, i. e., along circles concentric with the sun gear, no carriers or spiders for fixing the relative angular positions of the planet gears being employed in the gear unit.

It is therefore one of the objects of the invention to distribute the load uniformly among the three planet gears for the entire face width and to avoid radial forces tending to press the gears against each other. It is a further object of the invention to design small-pitch planetary units because this tends to make the construction compact and light. Other objects will be in part apparent and in part pointed out hereinafter.

These objects are achieved by entirely eliminating the axial supports of the planet gears with the result that the meshing teeth of the planet gears can adjust themselves freely relative to the ring gear teeth because no forces exerted by a spider or a carrier are in any way counteracting this self-adjustment. As the surface pressure is equal in all planet gears, the load will be equally divided among a plurality of planet gears with the result that the load carried by each planet gear can now be safely taken as the $n$th part of the total load in case $n$ gears are employed.

It is advantageous to guide the planet gears, and thus their cylindrical extensions, along a circular path to achieve a rolling effect. These extensions equipped if required with bearing sleeves are guided between the inside rims or races of external guiding means, hereinafter called outer races, and outside rims or races of internal guiding means, hereinafter called inner races. It is advisable to make the extensions such that the diameter of the bearing surface is approximately equal to the pitch diameter of the planet gears; when this is the case, the inside diameters of the outer races coincide substantially with the pitch diameter of the internal ring gear and the outside diameters of the inner races coincide substantially with the pitch diameter of the sun gear, with the result that the friction is substantially or entirely of the rolling type.

A number of other advantageous features also tend to equalize surface pressures and thus to divide the load uniformly among the various planet gears. This has also the effect that the meshing teeth are in contact over their entire face, even when the conventional ratio between face width and pitch is materially exceeded and is of the order of two. This is achieved by having the outer races which support the planet gears under load in their relative position to the sun gear, not fixed but yieldingly arranged, so that surface pressures of the planet gears are equalized. This can be accomplished by supporting the central gear solely on the shaft extensions extending to both sides, the extensions being simultaneously used as inner race for the planet gear extensions. For practical purposes it may be well to provide the shaft with outer rings or bushings to this end.

The aforementioned constructional features can be incorporated in reduction gear units having planet gears meshing with a plurality of internal gears of unequal number of teeth. When three planet gears are used, the difference may be three or a multiple of three. In such an arrangement it is possible to drive a set of internal gears of one type at a speed which differs from that of another set of internal gears having a different number of teeth. It is a good practice to arrange the internal gears supporting the planet gears and the internal gears driven by the planet gears symmetrically, which can for instance be done by providing a stationary internal gear in the center between two driven internal gears of equal shape or by providing a driven internal gear between two stationary internal gears of equal shape. The two identical internal gears of equal function may be considered as the two halves of one compound internal gear. When the gears are arranged in this manner all forces occurring between the teeth of anyone planet gear and the teeth of the compound internal gear as well as the forces occurring between the teeth of the same planet gear and the driven internal gear will result in a useful torque around the axis of the respective planet gear, while torsional forces acting in other directions are avoided.

A further method of distributing the surface pressures at the planet gears equally among the various planet gears is shown by another constructional feature described in the invention, which allows of shifting the stationary internal gears radially over a certain length so as to equalize the load on the various planet gears. Such an arrangement has a number of additional advantages in that the stationary internal gears which do not rotate under ordinary operating conditions, are held in position by means of a friction slip clutch or a similar device in such a way that they slip when an overload occurs, an arrangement which achieves an effective overload protection. In addition it is no longer required to provide limit switches to shut the gear unit off when extreme positions are reached.

Of special importance is the application of the invention in the case of reduction gears used for electrically driven chain hoists. Chains have the advantage as against wire ropes when used as lifting or pulling means in that sprockets of materially smaller diameter can be employed. Aside from the more compact design such an arrangement has the advantage that, assuming equal hoisting speeds, the chain sprocket of smaller diameter requires a lower speed reduction and thus a smaller gear mechanism as compared with a rope-type hoist. For electrically driven chain hoists with coil chain a small sprocket of approximately seven teeth is required. When using such a small chain sprocket it is at present impossible to accommodate the gear mechanism within the sprocket as this can be done within the sheath of rope winches, although the gear unit has inherently smaller proportions as the gear ratio can be kept at a lower value. Thus the advantage of the gear unit cannot be fully utilised at present, with the result that the mechanism as a whole is still rather large. A gear unit designed according to the invention avoids this disadvantage and it is now possible to accommodate the reduction gearing within a sprocket of small diameter without any difficulties. It is also advantageous to employ one of the aforementioned rotatable internal gears as chain sprocket.

The invention accordingly comprises the elements and combinations of elements, features of construction and arrangement of parts, which will be exemplified in the structure hereinafter described and the scope of the application which will be indicated in the following claims. In the accompanying drawings, in which a preferred embodiment of the invention, a reduction gearing for an electrically driven chain winch, is illustrated.

Fig. 1 is a vertical cross-section,
Fig. 2 is a partial cross-section taken along the line A—B.

In Fig. 1 a driving pinion employed as central or sun gear 2 is mounted on a shaft 1 which may be the driving shaft of an electric driving motor mounted to the gear housing 3 by means of a flange. Fastened to housing 3 by rivets 6 are two annular supporting means 4 and 5 carrying two internal ring gears 8 and 9. The annular extensions 7 and 77 of the internal ring gears 8 and 9 extend over a portion of the annular supporting means 4 and 5. The latter have bores 25 and 26 which extend between the annular parts 7 and 77 as shown in Fig. 1. Inserted in these holes and held between the extensions are compression springs 27 which are in a frictional engagement with the annular extensions 7 and 77. The frictional pressure of the holding means 4, 5 and 27 is sufficient to avoid any slip under ordinary operating conditions, but allows the annular extensions 7, 77 together with internal gears 8 and 9 to rotate when an overload occurs, e. g. when the hoist starts or when an extreme position is reached. Moreover, the internal gears 8, 9 are held movable in radial and circumferential directions so that their position with respect to the other gear elements, which will be described hereinafter, is automatically adjusted. The annular parts 7 and 77 have some radial clearance as indicated at 28.

Rotatably mounted between guide rings 4 and 5 is an additional ring-shaped part 10 which is equipped with an internal ring gear 11 and is shaped like a sprocket. The teeth provided for driving the chain are mounted as separate units 12 to the ring-shaped part 10. Between the teeth of the driving pinion 2 and the internal gears 8, 9 and 11 run the three planet gears 13, 14 and 15 whose full-length teeth mesh with pinion 2 and with the three internal ring gears. The internal ring gear 11 of ring-shaped part 10 has a number of teeth which differs from that of internal ring gears 8 and 9 held stationary under ordinary operating conditions, with the effect that internal ring gear 11 is rotated by the revolving planet gears 13, 14 and 15 relative to the stationary internal gears 8 and 9. As three planet gears are employed in this embodiment of the invention the difference between the number of teeth of the internal gear 10 and the two internal gears 8, 9 must be such that the tooth spaces coincide at least at three places at the circumference of the internal gears so as to allow the teeth of the planet gears to mesh full length with the three internal gars. When three planet gears are used the difference between the number of teeth of the internal gears must be three or a multiple thereof. The planet gears 13, 14 and 15 have shaft extensions 16, 17 which roll on the cylindrical inner surfaces 20, 21 of outer races 18, 19 fixed to the housing, the parts being advantageously used as face plates of the gear mechanism. The extensions 16, 17 of the planet gears roll on the outer surfaces of the inner races 22 and 23 consisting of rings mounted on shaft 1. The outer diameters of extensions 16, 17 coincide with the pitch-diameter of the planet gears.

The internal gears 8, 9 have a certain play on the teeth of the planetary gears by which they are supported. The holding means 4, 5 and 27 frictionally engage the extensions 7, 77 of the internal gears 8, 9 with such pressure that gears 8, 9 remain stationary during normal operation but assume an adjusted position in accordance with the position of the teeth of the planetary gears 13, 14, 15.

The annular part 10 equipped with internal gear 11 and designed as a chain sprocket is mounted in housing 3 on rolls 24, running between the cylindrical outer surfaces of the ring-shaped member 10 and the cylindrical inside surface of housing 3. As an alternative, special guiding members employed for the planet gears or the guiding members 18, 19 may simultaneously be used as guides for the rollers supporting the ring-shaped member 10 with its internal gear 11. Furthermore the member 10 may be supported just as well on rollers running on its annular inner surfaces.

As the planet gears can be sufficiently adjusted the whole system can be so arranged that each of the three planet gears takes the same load and thus has the same surface pressure. As spiders or carriers are not used, it is feasible to adjust the system in a direction tangential to the pitch circle which insures that every tooth engaged with another gear is uniformly stressed over its entire length. In addition it is possible to equip the shaft extensions of the planet-gears with bushings or to arrange the outer or inner races rotatably on their supports, e. g. by means of roller bearings. In this case purely rolling contact is achieved.

In view of its compact construction and its small proportions it is readily possible to have the whole unit run in oil. In addition the gear mechanism can easily be combined with a flange motor to form a compact self-contained unit.

In view of the above, it will be seen that the general objects of the invention are achieved and other advantageous results attained.

As many changes could be made in the above construction without departing from the form of the invention, it is intended that all matter contained in the above description or shown in the accompanying drawings shall be interpreted as illustrative and not in a limiting sense.

I claim:

1. A transmission gear, comprising in combination, a supporting housing; two first annular members secured to said housing spaced from each other and having cylindrical inner surface portions of equal diameter; a driving shaft extending through said housing coaxial with said cylindrical inner surface portions of said two first annular members; two second annular members fixed on said shaft and having cylindrical outer surface portions coaxial with and spaced the same distance from each other as said inner surface portions of said two first annular members so as to define two annular spaces between said first and said second annular members; three elongated planet gear members arranged in said housing and having axes parallel to the common axis of said cylindrical surface portion, each of said planet gear members provided with cylindrical portions located in said annular spaces between said cylindrical surface portions of said first and said second annular members, and each having a diameter equal to the radial width of said annular space so as to roll between said cylindrical surface portions rotatably supporting said driving shaft; a pinion fixed on said driving shaft meshing with said planet gear members; a plurality of internal gears located in said supporting housing and extending around said planet gear members meshing with the same and being supported on the same with play in radial and circumferential directions; extensions integral with said internal gears; axially directed holding means fixedly mounted in said housing frictionally engaging said extensions and holding said internal gears stationary during normal operation with said extensions and thereby said internal gears are slidable in radial and circumferential directions relative to said holding means and to said housing into an adjusted position in which the load is evenly distributed over said planet gear members; and driven internal gear means rotatably mounted in said housing extending around said planet gear members meshing with the same so as to be rotated by said planet gear members, said driven internal gear means having a number of teeth different from the number of teeth of said stationary internal gears, the difference being $3n$, $n$ being an integer.

2. A transmission gear, comprising in combination, a supporting housing; two first annular members mounted on said housing adjustable in radial direction and spaced from each other and having cylindrical inner surface portions of equal diameter; a driving shaft extending through said housing coaxial with said cylindrical inner surface portions of said two first annular members; two second annular members fixed on said shaft and having cylindrical outer surface portions coaxial with and spaced the same distance from each other as said inner surface portions of said two first annular members so as to define two annular spaces between said first and said second annular members; three elongated planet gear members arranged in said housing and having axes parallel to the common axis of said cylindrical surface portion, each of said planet gear members provided with cylindrical end portions located in said annular spaces between said cylindrical surface portions of said first and said second annular members, and each having a diameter equal to the radial width of said annular space so as to roll between said cylindrical surface portions rotatably supporting said driving shaft; a pinion fixedly mounted on said driving shaft spaced an equal distance from the ends thereof and meshing with said planet gear members; a pair of internal gears located in said supporting housing and extending around said planet gear members meshing with the same, and being symmetrically arranged in axial direction with respect to the transversal plane of symmetry of said planet gear members; extensions integral with said internal gears; a pair of annular supporting means fixedly mounted in said housing adjacent to said internal gears and formed with a plurality of bores extending in axial direction; spring means mounted in said bores frictionally engaging said extensions of said internal gears and holding said internal gears stationary during normal operational conditions, said spring means permitting radial and circumferential movement of said extensions and adjustment of said internal gears into an adjusted position in which the load is evenly distributed over said planet gear members; and driven internal gear means rotatably mounted in said housing extending around said planet gear members meshing with the same so as to be rotated by said planet gear members, said driven internal gear means having a number of teeth different from the number of teeth of said internal gears, the difference being $3n$, $n$ being an integer, and having such axial extension as to fit between said internal gears.

3. A transmission gear, comprising in combination, a supporting housing; two first annular members fixedly secured to said housing spaced from each other and having cylindrical inner surface portions of equal diameter; a driving shaft extending through said housing coaxial with said cylindrical inner surface portions of said two first annular members; two second annular members fixed on said shaft and having cylindrical outer surface portions coaxial with and spaced the same distance from each other as said inner surface portions of said two first annular members so as to define two annular spaces between said first and said second annular members; three elongated planet gear members arranged in said housing and having axes parallel to the common axis of said cylindrical surface portion, each of said planet gear members provided with cylindrical portions located in said annular spaces between said cylindrical surface portions of said first and said second annular members, and each having a diameter equal to the radial width of said annular space so as to roll between said cylindrical surface portions rotatably supporting said driving shaft; a pinion fixedly mounted on said driving shaft meshing with said planet gear members; a plurality of internal gears located in said supporting housing and extending around said planet gear members meshing with the same; extensions integral with said internal gears; supporting means fixedly mounted in said housing adjacent to said internal gears and formed with a plurality of bores located opposite said extensions; spring means mounted in said bores frictionally engaging said extensions of said internal gears and holding said internal gears stationary during normal operational conditions, said spring means permitting radial and circumferential movement of said extensions and adjustment of said internal gears into an adjusted position in which the load is evenly distributed over said planetary gear members; and driven internal gear means rotatably mounted in said housing extending around said planet gear members meshing with the same so as to be rotated by said planet gear members, said driven internal gear means having a number of teeth different from the number of teeth of said internal gears, the difference being $3n$, $n$ being an integer.

References Cited in the file of this patent

UNITED STATES PATENTS

| Number | Name | Date |
|---|---|---|
| 476,101 | Thomson | May 31, 1892 |
| 1,270,809 | Freeman | July 2, 1918 |
| 1,323,245 | Borkes | Dec. 2, 1919 |
| 1,502,107 | McCollum | July 22, 1924 |
| 1,609,074 | Evans | Nov. 30, 1926 |
| 1,635,162 | Joyce | July 5, 1927 |
| 1,925,943 | Stein | Sept. 5, 1933 |
| 1,970,251 | Rossman | Aug. 14, 1934 |
| 2,053,130 | Cheyne | Sept. 1, 1936 |
| 2,500,393 | Williams | Mar. 14, 1950 |